May 7, 1929.  J. KJEKSTAD  1,712,114
PROCESS OF AND APPARATUS FOR ELECTRIC ARC WELDING
Filed June 22, 1918  2 Sheets-Sheet 1
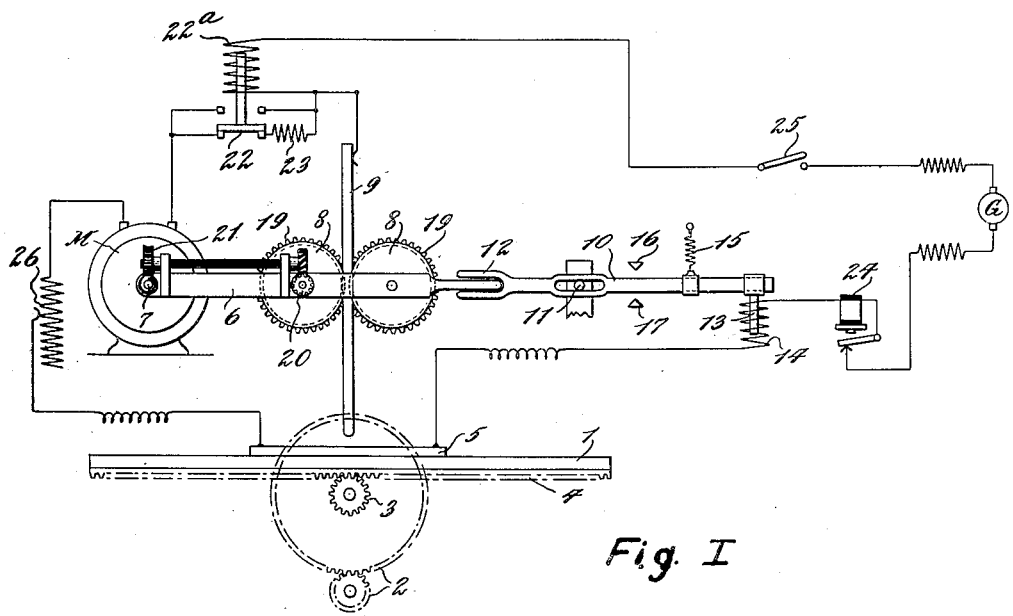
Fig. I
INVENTOR.
Johannes Kjekstad
BY
Rosenbaum, Stockbridge & Borst
ATTORNEYS.

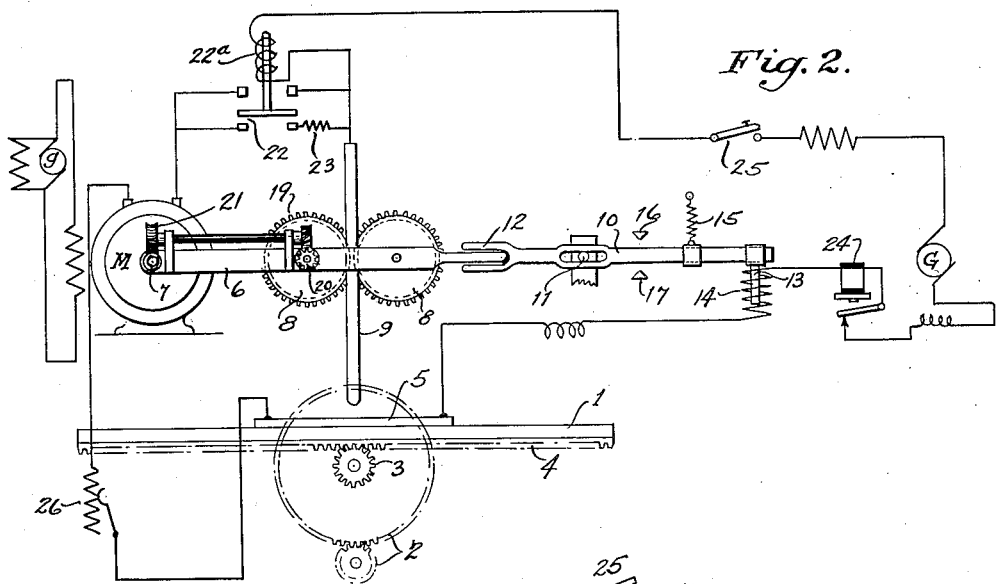
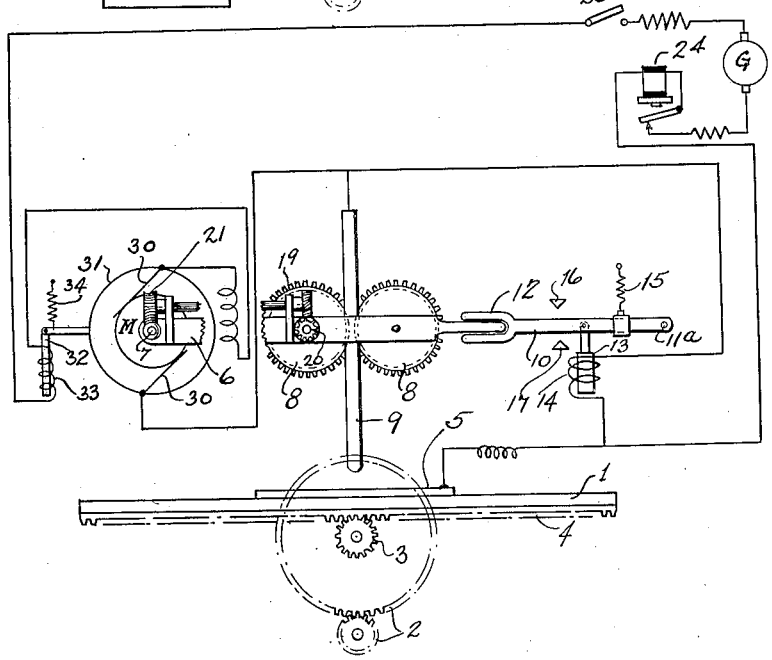

Patented May 7, 1929.

1,712,114

UNITED STATES PATENT OFFICE.

JOHANNES KJEKSTAD, OF BROOKLYN, NEW YORK, ASSIGNOR OF ONE-HALF TO WILLIAM SCHENSTROM, OF NEW YORK, N. Y.

PROCESS OF AND APPARATUS FOR ELECTRIC-ARC WELDING.

Application filed June 22, 1918. Serial No. 241,338.

This invention relates to electric welding by means of an electric arc and has particular application to that character of welding known as metallic arc welding in which the metal of one of the electrodes is fused by the heat of the arc and the fused metal deposited upon the seam or line of fracture to solder or secure the edges thereof together, although fundamentally the invention is also applicable to carbon arc welding.

In order to produce a uniform weld of proper character, it is essential that the characteristics of the arc be maintained substantially constant, the most important factor in this respect being apparently the temperature of the arc. The temperature is dependent on the proportion of the rate at which energy is being consumed in the arc to the rate at which it is being dissipated by way of radiation and conduction. If the former rate is the larger of the two, the temperature will rise, and vice versa. The radiation is in turn dependent on the length of the arc; an increase in length will accelerate the radiation, but at the same time will also increase the electrical resistance of the arc, causing its voltage to rise which again will affect its energy consumption.

On account of this interdependency of the several factors, the problem becomes a very complicated one. If the length of the arc remains substantially the same, however, its temperature will rise and drop with the number of watts consumed in it; therefore, by keeping the watt consumption within certain limits it becomes possible to maintain the arc at an approximately constant temperature.

It has been variously proposed heretofore to automatically secure a constant wattage either by providing means to secure a constant voltage across the arc in a constant current circuit, or by providing means to secure a constant amperage in a constant potential circuit. I have found that in commercial practice systems of this kind do not accomplish the desired results, but that, for instance, with constant potential generators of the capacity used in arc welding the voltage across the arc is subject to considerable variation which strongly affects the character of the weld.

This variation in voltage results from changes in the resistance of the arc, due to its length being changed. The change in length is due to various factors, particularly in metallic arc welding, such as irregularity in the feed of the pencil or fusible electrode toward the work to compensate for its own consumption, the natural tremor or unsteadiness of the hand and the unevenness in the size and character of the pencils. At some places they are often more refractory than at others or contain impurities with the result that they will vary considerably in the rate at which they are consumed from one end to the other. Local unevenness in the face of the work is also a cause of variations in the length of the arc.

An object of my invention is to keep both the voltage and current of the arc within certain narrow limits, thereby insuring an approximately constant watt consumption. Besides insuring a uniform weld this has the additional advantage of maintaining the load upon the generator approximately constant.

My invention comprehends the utilization of the changes due to variations in the voltage and current of the arc to attain this result. Means are provided in a circuit in shunt with the arc, which are responsive to variations in the arc voltage to regulate the length of the arc by varying the rate of feed of the metal supplying electrode and thus keep the voltage of the arc within narrow limits.

Means are also provided which are responsive to variations in the arc current, to regulate the resistance of the arc in such a way as to keep the amperage of the arc within narrow limits. This is preferably done by making the variations in current operate a controlling device for the electrode so as to regulate the length of the arc by raising or lowering the electrode with respect to the work, thereby maintaining the current in the arc substantially constant.

Specifically in order to regulate the arc voltage, I continuously feed the electrode toward the work, utilizing the variations in voltage to vary the rate of feed in such a way that the variations are counteracted. This may be done by connecting a motor in shunt with the arc and using the motor for feeding the pencil toward the work. The rate of feed may then be made to vary in accordance with the voltage across the arc.

To protect the motor against too violent variations in voltage when the arc is drawn or when it is broken, a resistance equivalent to the arc is arranged to be respectively cut out or inserted in the shunt circuit.

While such a feed motor will take care of gradual or progressive changes in conditions, it is too sluggish to take care of sudden or instantaneous changes, as when an unevenness is encountered in the face of the work, or an unusually large amount of metal drops off the end of the pencil. To compensate for these sudden changes I utilize current changes in the welding circuit due to variations in the arc resistance to quickly move the pencil to or from the work to restore the arc to its normal resistance, thus maintaining the current substantially constant. Preferably this is done by a relatively quick acting electro-magnetic device energized by the welding current.

By these means the arc is made self-regulating, thereby not only cheapening the process by obviating the necessity of highly skilled labor, but also making the string or deposit of metal more uniform than is possible by hand manipulation of the electrode.

My invention also includes other details and features of construction, as will hereinafter more fully appear.

In the accompanying drawing Fig. 1 is a conventional representation of a welding system embodying my invention and adapted to carry out my method.

Fig. 2 is a diagram illustrating a slightly modified arrangement of parts of my invention, in which the feeding motor is separately energized and Fig. 3 is a diagram illustrating a slight modification of my system in which the feeding motor is connected in series with the arc.

In the illustrated embodiment, a table or carriage 1 is mounted to travel along suitable guides and to be driven at any desired speed by means of power applied through the gearing 2 to the pinion 3, the latter engaging a rack 4 on the under side of the table. Upon this table is to be mounted the work upon which the welding is to be done, the work being represented by the plate 5 assumed to have a seam or fracture, the edges of which are to be welded together. Mounted above the table is a frame 6 pivoted at 7 and having mounted in it two feeding rolls 8, 8 between which is gripped a metallic electrode 9 mounted with its lower end adjacent the work 5 and adapted to be fed towards the same by the rotation of the rollers 8. A beam or lever 10 is pivoted between its extremities upon a fixed stud 11 and is preferably adjustable longitudinally thereon to vary the lever arms. This beam has at one extremity a fork 12 adapted to engage the frame 6 at a point opposite the location of the pivot 7 of said frame, and at the opposite end the beam carries a depending armature 13 forming the core of a solenoid 14. A spring 15 opposes the action of the solenoid upon the beam, the movement of the latter both up and down being limited by stops 16 and 17. On the shafts of the feed rolls 8 are intermeshing gears 19, 19, with one of which is associated a spiral gear 20 to which power is communicated through a reduction gearing 21 from an electric motor M. The electric circuits are arranged so that the solenoid 14 is in series with the metal electrode 9 and the work 5, the welding arc in the same circuit being maintained between the end of the electrode and the work, as will be hereinafter explained. The electric motor is in shunt around the arc, and in circuit with the motor is a cut-out 22, the function of which is to automatically insert a resistance 23 in the motor circuit when occasion requires. A slow-acting cut-out 24 and a switch 25 are arranged in the welding circuit for a purpose to be explained. There is also a rheostat 26 in the motor circuit for purposes of motor regulation.

When the switch 25 is closed at the initiation of the operation, the pencil 9 is out of contact with the work 5 and the entire current passes through the motor M. The amperage of the current is therefore small and the solenoid $22^a$ is not sufficiently energized to raise the movable contact member, hence the resistance 23 is in, as shown. The motor thereupon feeds the pencil down until it contacts with the work, whereupon the solenoid 14 is strongly energized, due to the short circuit conditions, and attracts the armature 13, elevates the pencil until the arm 10 engages the stop 17, and strikes an arc. The switch 22 is meantime raised and the resistance 23 is cut out. The motor continues to operate and cause the pencil 9 to be fed toward the work at a rate predetermined by the position of the rheostat 26, this rate being as nearly as possible in exact proportion to the consumption of the electrode. The heat of the arc fuses the extremity of the pencil, permitting the metal to be deposited upon the seam or fracture. The table 1 is also being given a movement of translation with respect to the electrode at a rate in proportion to the electrode feed and the size of "string" desired, and consequently under perfectly uniform conditions a string of metal is deposited upon the seam or line of fracture of the work. In practice, however, the lack of uniformity above referred to is encountered.

When these irregularities occur they cause a variation in arc resistance and a consequent variation in potential and current at the arc. As above explained, the motor M under these conditions operates to maintain the voltage constant, to do which, in the illustrated embodiment, it automatically increases or decreases its speed and thereby automatically varies the rate of feed of the pencil to compensate for the changed conditions and restore the arc to normal resistance.

In the event that the motor does not act quickly enough, the resultant change in current in the welding circuit brings the solenoid 14 and its associated parts into operation to restore the current to normal. Any momentary lengthening of the arc results in less current through the solenoid 14, which permits the spring to lift the beam and lower the electrode to the extent necessary to restore it to normal condition. Likewise, if the arc becomes momentarily short, the excessive current then flowing through the solenoid 14 will depress the end of the beam and raise the electrode to the required extent. Owing to the fact that the motor which effects the normal feed of the electrode is less sensitive to momentary changes in the resistance of the arc, than the solenoid 14, the changes are compensated for by the solenoid before the speed of the motor changes, and although the irregular conditions of the arc, if prolonged, might affect the speed of the feed motor, the practical result is that the motor feed remains substantially constant and normal and that the raising and lowering of the frame 6 takes care of the sudden abnormal or irregular arc conditions. If for any reason the abnormal conditions continue after the beam 10 has reached its limit of movement in either direction, then the further variation in the arc is taken care of by the motor, which will speed up or slow down according to whether more or less current is shunted to the motor circuit. In this way the two instrumentalities cooperate to take care of any and all conditions. It follows that by reason of this accurate control of the electrode and resultant uniformity of the arc, a comparatively short arc can be used and a relatively low voltage is therefore required.

Inasmuch as the normal feed of the electrode is provided by a motor which responds to prolonged changes in the resistance of the arc, it is evident that when different sizes of electrodes within certain limits are used the motor automatically changes the rate of the feed. The larger the electrode the slower will it be consumed and accordingly the slower will be its feed, and vice versa.

The slow-acting cut-out 24 is intended to protect the solenoid 14 in case by accident or otherwise the end of the electrode should stick to the work and thus short-circuit the main current. The cut-out 22 also operates to protect the motor in case by accident or otherwise the arc becomes broken. In such an event the armature of the cut-out opens the circuit and compels the current to flow through the safety resistance 23.

It will be understood that the speed of travel of the table 1 can be adjusted to any desired ratio to the feed speed of the electrode and thereby vary the size of the string. It will also be understood that the motor M which feeds the electrode may also be arranged to move the table, and that any usual arrangement of cone-pulleys or change-gear device may be adopted to obtain the desired ratio of movement between these elements.

As indicated in Figure 2, the field of the motor M may be separately excited from a suitable source of power $g$. The arrangement of the other parts of the circuit remains substantially the same. An arrangement is also possible by which the motor M which takes care of the feed is connected in series with the arc as indicated in Fig. 3. In order that the speed of the motor may vary inversely to the current it is desirable to mount the brushes 30 of the motor M upon a rocking ring 31 to which is connected an armature 32 responsive to a solenoid 33 that is connected in series with the motor. A suitable spring 34 opposes the action of the solenoid 33 upon the armature 32. Thus as the current flow through the motor M and the arc increases the solenoid 33 will increase its pull upon the rocking ring 31 and shift the brushes 30 so as to decrease the speed of the motor M and thus decrease the rate of feeding of the pencil 9. The solenoid 14 taking care of the more rapid fluctuations in the current may be connected in shunt with the arc so as to be responsive to variations in the voltage. In this arrangement the lever 10 must be changed from a first to a second degree lever by attaching the armature 13 thereto between the pivot 11ª and the connection between the levers 6 and 10. It is also obvious that various other modifications may be made in the construction shown in the drawings and above particularly described for carrying out my method, within the principle and scope of my invention.

I claim:

1. An electric arc welding apparatus comprising an electric circuit including the work and an electrode, a feeding device operative to feed the electrode relatively toward the work and regulatable as to its rate of feed, and an electric translating device operative to raise and lower the electrode to maintain the arc substantially constant, one of said devices being in shunt with the arc and responsive to variations in voltage across the arc and the other being in series with the arc and responsive to changes in the welding current.

2. An electric arc welding apparatus comprising an electric circuit including the work and an electrode, an electric motor operative to feed the electrode relatively toward the work and responsive to load conditions in the welding circuit for regulating its rate of feed, and an electric translating device responsive to load conditions in the welding circuit and operative to raise or lower the electrode and restore the arc to normal condition.

3. An electric arc welding apparatus comprising an electric circuit including the work and a metal-supplying electrode, a feeding device operative to feed the electrode relatively toward the work, means responsive to variations in voltage across the arc for regulating the rate of feed of the feeding device, and an electric translating device responsive to changes in the welding current and operative to raise or lower the electrode and restore the arc to normal condition.

4. An electric arc welding apparatus comprising an electric circuit including the work and a metal-supplying electrode, means for relatively moving the work and electrode to cause the electrode to travel across the work along the line to be welded, a feeding device operative to feed the electrode relatively and continuously toward the work, means responsive to variations in voltage across the arc for regulating the rate of feed of the feeding device, and an electric translating device responsive to changes in the welding current and operative to raise or lower the electrode and restore the arc to normal condition.

5. An electric arc welding apparatus comprising an electric circuit including the work and a metal-supplying electrode, means for relatively moving the work and electrode to cause the electrode to travel across the work along the line to be welded, a movable frame supporting the electrode and including electrode feeding mechanism, an electric motor arranged in shunt with the arc and connected to drive the feeding mechanism, and an electro-magnetic device in series with the arc and operative to raise or lower said frame to compensate for irregular conditions of the arc.

6. An arc welding apparatus comprising a welding head and means adapted to feed a fusible electrode continuously through said head at a rate varying with the voltage across the arc to maintain the welding arc, and electromagnetic means arranged to be actuated when welding current begins to flow to move the electrode away from the work to start the arc.

7. An arc welding machine, comprising a tiltable support, a fusible electrode, means on said support controlled by the arc length for feeding said fusible electrode to the work, and means for tilting said support to vary the distance of said electrode from said work.

8. In an arc welding machine, an electrode, a movable electrode support, a work support, an arc welding circuit connected through said electrode and work, a switch in said circuit, means operable upon the closing of said switch to shift said movable electrode support toward the work, means operable upon contact of the electrode with the work to shift said support away from the work.

9. In an arc welding machine, an electrode, a movable support for the electrode, a work support, a welding circuit connected through the electrode and work, and means controlled from the welding circuit to simultaneously move the electrode with respect to its support and the support bodily toward the work.

10. In an arc welding machine, an electrode, a movable support for the electrode, a work support, a welding circuit connected through the electrode and work, means carried by said electrode support for feeding the electrode toward the work and means controlled from the welding circuit to simultaneously increase the speed of the electrode feeding means and move said electrode support bodily toward the work.

11. In an arc welding machine, an electrode, a movable support for the electrode, a work support, a welding circuit through the electrode and work, means carried by said support to feed the electrode toward the work, a motor for driving said feeding means, connections from said welding circuit to said motor to increase the speed thereof as the voltage across the arc increases, and means controlled from the welding circuit and operable upon the establishment of a predetermined voltage across the arc to move said electrode support bodily toward the work.

12. An arc welding machine, comprising a fusible electrode cooperating with the welding joint to strike an arc at said joint, mechanism for feeding said electrode, means for progressively moving said electrode relative to said joint, and means controlled by voltage variations in said arc for controlling both the speed of said feed and the speed of progression of said electrode.

In witness whereof, I subscribe my signature.

JOHANNES KJEKSTAD.